United States Patent [19]
Fausel

[11] Patent Number: 5,860,706
[45] Date of Patent: Jan. 19, 1999

[54] BUCKLE HOLDER MADE OF A REINFORCED BELT STRAP FOR A SEAT BELT IN A MOTOR VEHICLE

[75] Inventor: Joachim Fausel, Tübingen, Germany

[73] Assignee: Micro Compact Car Aktiengesellschaft, Biel, Switzerland

[21] Appl. No.: 686,204

[22] Filed: Jul. 25, 1996

[30] Foreign Application Priority Data

Aug. 18, 1995 [DE] Germany ................. 195 30 445.4

[51] Int. Cl.⁶ .................................................. B60R 22/03
[52] U.S. Cl. ......................... 297/481; 280/801.1
[58] Field of Search .................... 297/468, 471, 297/472, 482, 481; 280/801.1

[56] References Cited

U.S. PATENT DOCUMENTS

| | | | |
|---|---|---|---|
| 2,639,852 | 5/1953 | Saunders et al. | 297/468 |
| 4,157,841 | 6/1979 | Bergman et al. | 297/482 |
| 4,645,231 | 2/1987 | Takada | 280/801.1 |
| 4,966,393 | 10/1990 | Tokugawa | 280/801.1 |

FOREIGN PATENT DOCUMENTS

| | | | |
|---|---|---|---|
| 78945 | 5/1983 | European Pat. Off. | 280/801.1 |
| 0327968A1 | 8/1989 | European Pat. Off. | |
| 2146616A1 | 2/1973 | France . | |
| 1731253 | 12/1970 | Germany . | |
| 3007645 | 10/1981 | Germany . | |
| 3539538 | 5/1986 | Germany . | |
| 3816834 | 11/1989 | Germany . | |
| 4024713 | 2/1991 | Germany . | |
| 56-12136 | 3/1981 | Japan . | |
| 1384386 | 2/1975 | United Kingdom . | |

Primary Examiner—Peter R. Brown
Attorney, Agent, or Firm—Evenson McKeown Edwards & Lenahan, PLLC

[57] ABSTRACT

The stiffness of a buckle holder made of a reinforced belt strap for a seat belt in a motor vehicle by means of which the buckle is supported in an upwardly projecting manner at a distance from its fastening point close to the vehicle floor is achieved by means of an additional, inherently stiff strip which is fixed on the belt strap and which still permits a yielding at least in a transverse direction. The strip is sewn to the belt strap by means of several seams which are situated relatively closely side-by-side, in which case the close course of the sewn seam contributes to the increase of the stiffness of the buckle holder.

21 Claims, 2 Drawing Sheets

Fig. 1
Fig. 2
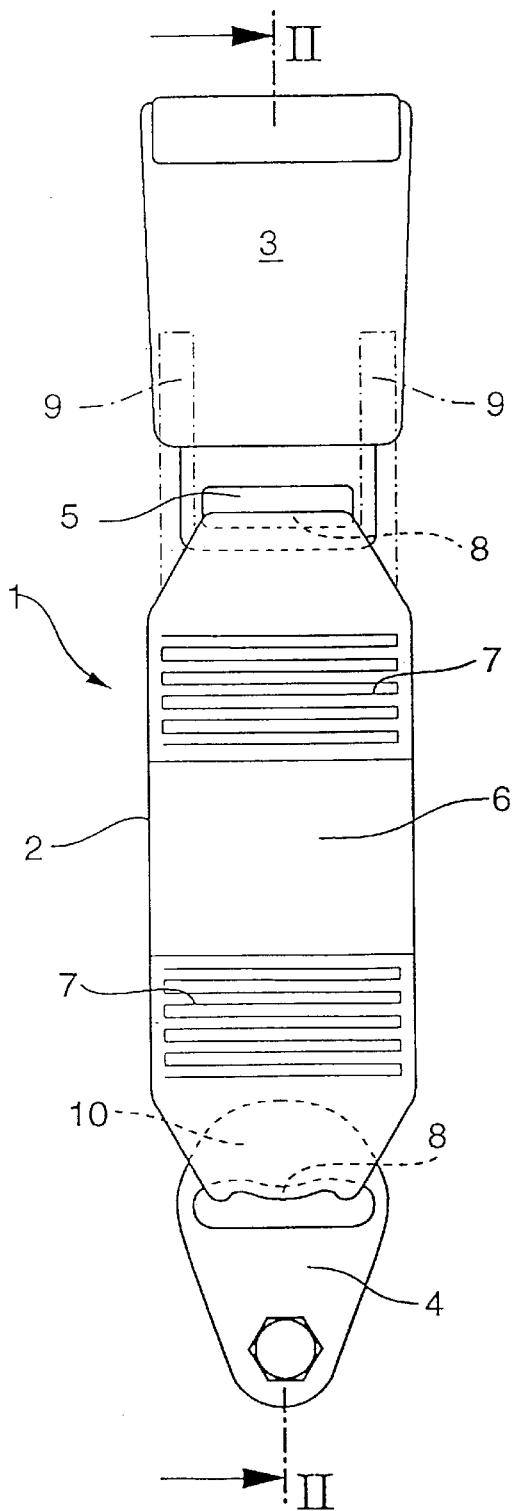
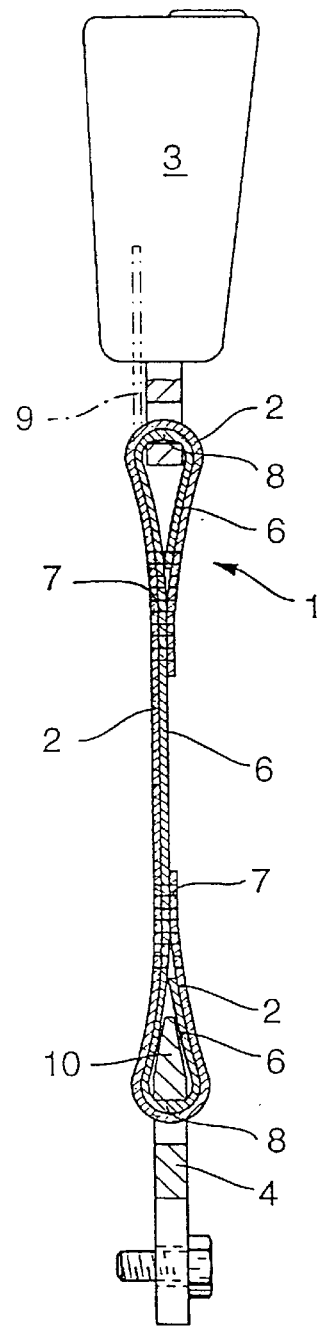

BUCKLE HOLDER MADE OF A REINFORCED BELT STRAP FOR A SEAT BELT IN A MOTOR VEHICLE

BACKGROUND AND SUMMARY OF THE INVENTION

This invention relates to a buckle holder made of a reinforced belt strap for a seat belt in a motor vehicle by means of which the buckle is supported at a distance from its force introduction point close to the vehicle floor in an upwardly projecting manner, the reinforcing of the buckle holder being achieved by means of an additional stiffening which is fixed to the belt strap and which permits a bending of the buckle holder at least in a transverse direction.

By means of a buckle holder of this type, the buckle of a seat belt is normally supported above an anchoring point in the vehicle, for example, next to the seat, at a predetermined height. As a result, a simple introducing and locking of the buckle latch is possible also with only one hand. However, the buckle holder should not only project rigidly upwards but, when the seat belt is put on, should be bendable at least in the occupant's direction so that the belt can be placed closely against the occupant and there is no slack which could have a disadvantageous effect in a crash. In addition, the flexibility of the buckle holder in the case of stress also prevents a hindering of the vehicle occupant when entering or leaving the vehicle.

By means of a low-cost belt strap as a component of the buckle holder, which bendably bridges the required path and supports the tensile forces, a self-supporting buckle holder can be implemented only if the belt is reinforced by an additional material. Such a belt strap is known from German Patent Document DE 35 39 538 A1, in which the required stiffness is achieved by the pouring of a plastic mass between two belt straps. In this case, care must be taken with respect to the selection of the belt strap as well as with respect to the selection of the pourable plastic in order to ensure that the materials can intimately connect while the desired stiffness or flexibility must be secondary to this requirement. In addition, it is possible that the pourable plastic may break during the bending of the buckle holder or may be sheared off the belt strap.

Rigid buckle holders have the disadvantage that, in the proximity of the buckle, the belt cannot be placed closely against the occupant's pelvic region. This results in a relatively large slack of the belt which will displace the occupant far to the front in the case of a crash. Another disadvantage is the lack of yielding possibility should the occupant unintentionally sit on the buckle.

It is also known to construct the buckle holder of a wire rope around which a wire is wound in a spiral manner, However, such buckle holders are expensive and heavy, and it is difficult to connect the wire rope with the buckle so that the connection is resistant to tearing.

With respect to the general background, reference is made to the following documents: German Patent Documents DE 40 24 713 A1; DE 38 16 834 A1; and 30 07 645 C2 and British Patent Document GB 1 384 386 30.

It is an object of the invention to construct the buckle holder of the above-mentioned type at low cost and in a durably operable manner.

This object is achieved according to the invention by means of an arrangement wherein the additional stiffening includes at least one inherently stiff strip which is sewn to the belt strap by means of a plurality of seams which are situated relatively closely side-by-side.

A separate strip, which has the desired stiffness in the longitudinal direction and in the transverse directions together with the belt strap, can be adapted individually to the conditions of a vehicle at low cost with respect to the material and shape.

An intimate and durable connection of the strip with the belt strap can be produced in a simple fashion by means of a sewing-together, in which case, as a result of a relatively close course of the sewn seam, the belt strap and the strip introduce their bending resistance equally, and the seams themselves also contribute to an increase of the stiffness of the buckler holder.

In addition, a different stiffness in the longitudinal direction and in the transverse directions can easily be determined by means of the firmly sewed-on strip corresponding to its material or shape and/or can also easily be implemented by a variable arrangement of several strips on one another or above one another or by several layers of the belt straps.

For a simple and durable connection with the belt strap, a strip made of synthetic or natural materials may be used which, with respect to its bending characteristics, may be selected to correspond precisely to the requirements of the buckle holder and by means of which a simple connection can be established.

The strip can project into a receiving device or gap in the buckle and therefore support this relatively heavy part additionally against a titling movement. Likewise, by means of the strip, the buckle holder can be provided with an intended longitudinal bending as the result of which the buckle holder or the seat belt is disposed more closely on the occupant.

A belt strap protection part can be integrated in one piece into the form of the fastened strip on the end side, which belt protection part prevents a wear of the belt strip at a buckling point, whereby a usual, separately inserted belt strap protection part is saved.

Other objects, advantages and novel features of the present invention will become apparent from the following detailed description of the invention when considered in conjunction with the accompanying drawings.

BRIEF DESCRIPTION OF THE DRAWINGS

FIG. 1 is a view of a buckle holder having a buckle and an attachment fitting on the other end constructed according to a preferred embodiment of the invention;

FIG. 2 is a lateral view of the same arrangement along Line II—II in FIG. 1.

DETAILED DESCRIPTION OF THE DRAWINGS

Figure 1A:
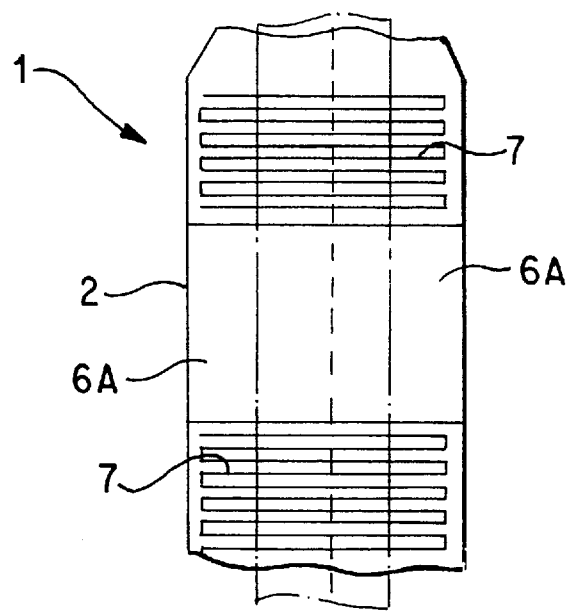
FIG. 1A is a partial view showing a modified inherently stiff strip for use in the arrangement of FIG. 1.

FIGS. 1 and 2 show a buckle holder 1 made of a belt strap 2 for a seat belt in a motor vehicle by means of which a buckle 3 is fixed at a distance from its fastening point close to the vehicle floor. By means of one end, the belt strap 2 is looped into an attachment fitting 4 by way of which it can be screwed to the vehicle floor or to the vehicle seat. On the opposite end, the belt strap 2 passes through a rectangular opening 5 on the buckle 3.

In order to achieve that the buckle holder 1 projects upward from the attachment fitting 4 by means of its own stiffness, an inherently stiff strip 6 is sewn to the belt strap 2 by means of which the stiffness of the buckle holder 1 can be individually influenced.

This may be a strip 6 made of synthetic or natural materials which, as the result of the selection of its material and shape (thickness and width) leads to a buckle holder which projects upward because of its own stiffness but which can be bent about its long transverse axis in the direction of the occupant. As a result, the buckle 3 can be placed close to an occupant when it is put on and a slack of the belt strap is prevented. The buckle 3 will also yield elastically when the occupant sits down on the upwardly projecting buckle 3 when he enters or leaves the vehicle.

The strip 6 is disposed in parallel to the belt strap 2 and is looped with it on the attachment fitting 4 and into the opening 5 of the buckle 3 and looped back from there where the layers of the strip 6 are sewn together with those of the belt strap 2 by means of a seam 7 which is placed relatively closely side-by-side. Because of the close course of the seam which extends back and forth in parallel in the transverse direction, this sewn seam also contributes to the increase of the stiffness of the buckle holder 1 which is why the thickness of the strip 6 can be less. However, it also results in an intimate connection of the strip 6 with the belt strap 2, whereby both can then introduce their bending resistance completely into the buckle holder 1. This fastening durably and reliably withstands a large number of bendings of the buckle holder 1.

With respect to the stiffness and the bending characteristics of the buckle holder 1, it may also be advantageous to sew several layers of the belt strap 2 together with one or several strips 6 or to let several strips 6 laterally adjoin one another (FIG. 1A).

Furthermore, the strip 6 may also have a preshaped longitudinal bend in order to favorably align the buckle holder 1 with respect to the occupant without additional expenditures. In addition, for protecting the belt strap 2 from damage at the attachment fitting 4 or at the buckle 3, the strip may be constructed as a belt strap protection part 8 at its buckling point, which otherwise would have to be inserted additionally at these buckling points of the belt strap 2 as a separate part between the belt strap 2 and its receiving device.

In a construction which is illustrated by a dash-dotted line, in the loop bending of the strip 6, an edge section can be cut into the strip 6 laterally in the longitudinal direction which can then project in a straight line into an opening or a slot within the buckle 3 whereby the buckle 3 is supported with respect to a tilting movement by the strip extension 9.

Likewise, the attachment fitting 4 may be constructed such that a stiff bearing of the belt strap 2 is promoted by the shaping of the attachment fitting 4 in that an oblong extension 10 engages in a supporting manner between the layers of the belt strap 2 and the strip 6. Such a shaping of the attachment fitting is possible at the upper as well as at the lower buckling point of the belt strap 2.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Buckle holder assembly for supporting a seat belt buckle of a motor vehicle seat belt system at a predetermined height above an anchoring member in a vehicle, comprising:
   a belt strap which in use is connected to and extends between the anchoring member and the buckle, and
   at least one stiff reinforcing strip means connected to the belt strap and extending between the anchoring member and the buckle for stiffening the belt strap sufficiently to maintain said buckle in an upright position above the anchoring member while also permitting bending of the belt strap by a vehicle occupant, said at least one stiff reinforcing strip means being sewn to the belt strap by a plurality of sewn seams.

2. Buckle holder assembly according to claim 1, wherein a plurality of layers of said belt strap are sewn together with the at least one reinforcing strip means to form a loop for engaging the buckle.

3. Buckle holder assembly according to claim 1, wherein the at least one reinforcing strip means includes a plurality of several narrow strips laterally adjoining one another.

4. Buckle holder assembly according to claim 1, wherein the at least one reinforcing strip means projects by means of an extension in a supporting manner into the buckle.

5. Buckle holder assembly according to claim 1, wherein, in use, the belt strap is looped around an oblong extension of one of the buckle and the anchoring member.

6. Buckle holder assembly according to claim 1, wherein the at lease on reinforcing strip means has a preshaped longitudinal bending.

7. Buckle holder assembly according to claim 1, wherein the at least one reinforcing strip means, together with the belt strap, is looped through an opening of at least one of said buckle and anchoring member with an interior one of said at least one reinforcing strip means forming a belt strap protection part in a looped-around area.

8. Buckle holder assembly according to claim 2, wherein the at least one reinforcing strip means includes a plurality of several narrow strips laterally adjoining one another.

9. Buckle holder assembly according to claim 8, wherein the at least one reinforcing strip means projects by means of an extension in a supporting manner into the buckle.

10. Buckle holder assembly according to claim 8, wherein, in use, the belt strap is looped around an oblong extension of one of the buckle and the anchoring member.

11. Buckle holder assembly according to claim 10, wherein the at least one reinforcing strip means has a preshaped longitudinal bending.

12. Buckle holder assembly according to claim 10, wherein the at least one reinforcing strip means, together with a belt strap, is looped through an opening of at least one of said buckle and anchoring member with an interior one of said at least one reinforcing strip means forming a belt strap protection part in a looped-around area.

13. Buckle holder assembly according to claim 8, wherein the at least one reinforcing strip means has a preshaped longitudinal bending.

14. Buckle holder assembly according to claim 8, wherein the at least one reinforcing strip means, together with a belt strap, is looped through an opening of at least one of said buckle and anchoring member with an interior one of said at least one reinforcing strip means forming a belt strap protection part in a looped-around area.

15. Method of making a buckle holder assembly for supporting a seat belt buckle of a motor vehicle seat belt system at a predetermined height above an anchoring member in a vehicle, comprising:
   a belt strap which in use is connected to and extends between the anchoring member and the buckle, and
   at least one stiff reinforcing strip means connected to the belt strap and extending between the anchoring member and the buckle for stiffening the belt strap sufficiently to maintain said buckle in an upright position above the anchoring member while also permitting bending of the belt strap by a vehicle occupant, said at least one stiff reinforcing strip means being sewn to the belt strap by a plurality of sewn seams,
   said method comprising:

reinforcing the belt strap by sewing the at least one stiff reinforcing strip means to the belt strap utilizing a plurality of sewn seams situated closely adjacent one another, and connecting a belt strap between the anchoring member and the buckle.

16. Method according to claim 15, wherein said sewing includes sewing together a plurality of layers of belt strap with the at least one reinforcing strip means to form a loop for engaging the buckle.

17. Method according to claim 15, comprising providing the at least one reinforcing strip means as a plurality of several narrow strips laterally adjoining one another.

18. Method according to claim 15, comprising projecting the at least one reinforcing strip means by means of an extension in a supporting manner into the buckle.

19. Method according to claim 15, comprising engaging an oblong extension of at least one of the buckle and the anchoring member in a supporting manner with a loop of the belt strap.

20. Method according to claim 15, comprising providing the at least one reinforcing strip means with a preshaped longitudinal bending characteristic.

21. Method according to claim 15, comprising extending the at least one reinforcing strip means, together with the belt strap, through a loop at at least one of the buckle and anchoring member such that an interior one of said at least one reinforcing strip means forms a belt strap protection part in the looped around area.

* * * * *